United States Patent
Rasmus et al.

(10) Patent No.: US 10,135,644 B1
(45) Date of Patent: Nov. 20, 2018

(54) LOW POWER PASSIVE OFFSET INJECTION FOR 1-TAP DECISION FEEDBACK EQUALIZER

(71) Applicant: QUALCOMM Incorporated, San Diego, CA (US)

(72) Inventors: Todd Morgan Rasmus, Cary, NC (US); Joseph Natonio, Pleasant Valley, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/691,817

(22) Filed: Aug. 31, 2017

(51) Int. Cl.
  *H04L 25/03* (2006.01)
(52) U.S. Cl.
  CPC .. *H04L 25/03057* (2013.01); *H04L 25/03949* (2013.01)
(58) Field of Classification Search
  CPC .............. H04L 25/03057; H04L 25/03949
  See application file for complete search history.

(56) References Cited

U.S. PATENT DOCUMENTS

| | | | |
|---|---|---|---|
| 6,211,716 B1 * | 4/2001 | Nguyen | H03F 3/45973 327/307 |
| 7,720,141 B2 | 5/2010 | Fang et al. | |
| 7,961,817 B2 | 6/2011 | Dong et al. | |
| 9,306,775 B1 | 4/2016 | Kotagiri et al. | |
| 9,485,120 B1 * | 11/2016 | Sun | H04L 25/03057 |
| 9,602,315 B2 | 3/2017 | Islam et al. | |
| 2002/0181601 A1 * | 12/2002 | Huang | H04L 25/061 375/258 |
| 2016/0173299 A1 * | 6/2016 | Islam | H04L 25/03057 375/233 |

OTHER PUBLICATIONS

Kimura H., et al., "A 28 Gb/s 560 mW Multi-Standard SerDes With Single-Stage Analog Front-End and 14-Tap Decision Feedback Equalizer in 28 nm CMOS," IEEE Journal of Solid-state Circuits, Dec. 2014, vol. 49, No. 12, p. 3091-3103.

* cited by examiner

*Primary Examiner* — Dac Ha
(74) *Attorney, Agent, or Firm* — Qualcomm Incorporated

(57) ABSTRACT

A low power 1-tap decision feedback equalizer (DFE) is disclosed. The DFE can include a plurality of AC-coupling networks, each having an input coupled to an output of a continuous time linear equalizer (CTLE) within an active stage of a receiver to receive a corresponding pair of differential signals of data, and an output coupled to a respective one of a plurality of data samplers to present a high frequency component of the corresponding pair of differential signals to the respective data sampler. The DFE can further include a plurality of transport paths, each transport path coupled to a respective AC-coupling network to receive the corresponding pair of differential signals. Each transport path can include one of the data sampler and an injection element to passively inject an offset into the high frequency component at an input of the respective data sampler.

15 Claims, 4 Drawing Sheets

LOW POWER PASSIVE OFFSET INJECTION FOR 1-TAP DECISION FEEDBACK EQUALIZER

FIELD OF DISCLOSURE

Aspects of the present disclosure relate generally to signal receivers, and more particularly to low power passive offset injection for 1-tap decision feedback equalizer (DFE) usable in receivers.

BACKGROUND

For a high speed serial digital communication system that transports a series of data symbols over time, one significant distortion source is inter-symbol interference (ISI) due to the non-ideal transfer function of the channel between the transmitter and receiver. ISI is a form of symbol interference from adjacent symbols which degrades the bit error rate (BER) performance of the system. One common mitigation technique against ISI is the employment of an equalizer in an active stage of the receiver. Input signals received at input/output (I/O) pads of a chip are passed through a front end of the receiver in the chip, which typically includes AC-coupling networks to remove the common mode (CM) level in the input signals before further processing the signals using an equalizer in the active stage of the receiver. In the active stage of the receiver, the equalizer can compensate for the non-ideal transfer function of the channel in order to mitigate ISI. Different types of equalizers may be used. One particular form of equalizer is known as a decision feedback equalizer (DFE), where a plurality of weighted delay line outputs are combined to provide an improved receiver response. The weights are determined by bit decisions at the receiver output which are feedback to the receiver input.

If the channel loss is limited, 1-tap DFEs (i.e., a DFE using a single offset injection element) may be employed to negate the effects of the first post cursor. One common way for adding the tap-1 coefficient to the data signals is by injection using a summing stage. A typical summing stage includes active transistor stages, such as resistive or capacitively loaded summers, dual-port samplers, etc. FIGS. 1A and 1B show a conventional resistively loaded summing stage in a DFE and a conventional capacitively loaded summing stage in another DFE, respectively.

Referring to FIG. 1A, the DFE 100 includes an input stage 110 having a pair of transistors to receive a differential signal pair (IN and IN_bar) at the gates of the transistors. The drains of the transistors are connected to a pair of resistors 120. The drains of the transistors are further connected to one or more summing stages 130 (only one summing stage is shown in FIG. 1A to avoid obscuring the illustration). Each summing stage 130 receives a tap (H1 and H1_bar), also referred to as an offset injection element. Each summing stage 130 actively injects an offset from the tap into the input signal pair to generate a pair of output signals at the drains of the transistors. However, such scheme results in an output settling time that correlates to a product of the resistance of the resistor 120 and the capacitance of the wire in the circuitry (i.e., RC time constant). Another drawback of the DFE 100 is high power consumption due to the large bias currents for the input stage 110 and the summing stages 130.

FIG. 1B shows another conventional DFE 150, which replaces the resistors 120 with a pair of resettable capacitors 160, implemented with a pair of p-type Metal Oxide Semiconductor (pMOS) transistors. By replacing the resistors 120 with the capacitors 160, the RC settling time of the outputs can be eliminated. However, the drawback of high power consumption due to the large bias currents for the input stage 110 and the summing stages 130 remains.

Furthermore, the above schemes can suffer linearity or compression issues when injecting large magnitudes of offset. Thus, there is a need in the art for improved 1-tap DFEs that are more power efficient and provides better linearity even when injecting large magnitude of offsets.

SUMMARY OF THE DISCLOSURE

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a low power decision feedback equalizer (DFE). The DFE includes a plurality of AC-coupling networks, each having an input coupled to an output of a continuous time linear equalizer (CTLE) within an active stage of a receiver to receive a corresponding pair of differential signals of data from the CTLE, and an output coupled to a respective one of a plurality of data samplers to present a high frequency component of the corresponding pair of differential signals to the respective one of the plurality of data samplers. The DFE further includes a plurality of transport paths, each of the plurality of transport paths coupled to a respective one of the plurality of AC-coupling networks to receive the corresponding pair of differential signals from the respective one of the plurality of AC-coupling networks. Each of the transport paths has one of the plurality of data samplers and an injection element to passively inject an offset into the high frequency component of the corresponding pair of differential signals at an input of the respective one of the plurality of data samplers.

In some embodiments, each of the plurality of AC-coupling networks comprises a pair of capacitors.

In some embodiments, the DFE further includes a baseline wander (BLW) correction circuit to provide an error correction signal to each of the plurality of transport paths. The BLW correction circuit may include a first summing stage and a differential difference amplifier (DDA) having a first input and a second input, the first input being configured to receive the data from the CTLE and the second input being configured to receive a feedback error signal from the first summing stage of the BLW correction circuit. The DDA can be configured to generate the error correction signal based on the input data and the feedback error signal from the first summing stage.

Another aspect of the disclosure relates to a method to provide decision feedback equalization. In some embodiments, the method includes applying continuous time linear equalization in an active stage of a receiver to data received from a front end of the receiver, presenting a high frequency component of the data to a plurality of data samplers within a plurality of transport paths, in each of the plurality of transport paths, passively injecting an offset into the high frequency component of the data, and inputting the high frequency component of the data with the offset to the plurality of data samplers.

In some embodiments, the method further includes generating an error correction signal via a baseline wander (BLW) correction circuit, and providing the error correction signal to each of the plurality of transport paths. The BLW correction circuit can include a differential difference amplifier (DDA), and generating the error correction signal includes using the DDA to generate the error correction signal based on the data and a feedback error signal.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

Figure 1:
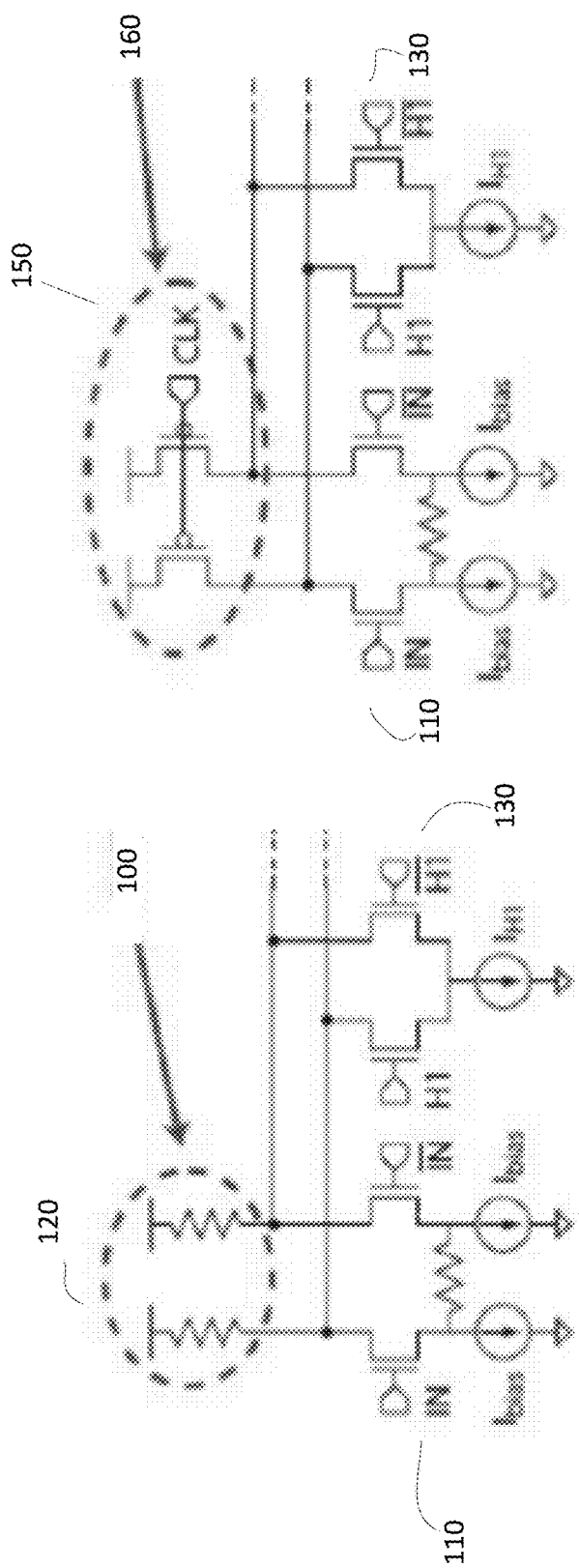
FIG. 1A shows a conventional resistively loaded summing stage in a decision feedback equalizer (DFE).
FIG. 1B shows a conventional capacitively loaded summing stage in another DFE.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Acronyms and other descriptive terminology may be used merely for convenience and clarity and are not intended to limit any concept disclosed herein.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements may be physical, logical, or a combination thereof. As used herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not limit the quantity or order of the element. Rather, the designations are used herein as a convenient method of distinguishing between two or more elements or instances of an element. Thus, a reference to first and second elements does not mean that only two elements can be employed, or that the first element must precede the second element. As used herein, references to the plural include the singular, and references to the singular include the plural.

Disclosed herein are embodiments of a low power, highly linear, 1-tap decision feedback equalizer (DFE) usable in receivers, in particular, high speed serializer/deserializer (SerDes) receivers. In one embodiment, data received can be input to a Continuous Time Linear Equalizer (CTLE), which drives multiple identical transport paths of the DFE. To allow passive injection of an offset into the output differential signals from the CTLE, AC-coupling networks are employed in each of the transport paths to impress or to present a high frequency component of the output differential signals from the CTLE to the downstream circuitry in the transport path. The AC-coupling networks may be implemented with one or more capacitors.

Because the DFE is unrolled, the tap-1 offset is static. Such offset can be passively injected into the high frequency component received at a first one of the at least two summing stages. Such passive offset injection can significantly reduce overall power consumption by the DFE.

As discussed above, in each transport path, there are at least two summing stages and an offset injection element (a.k.a., a tap block). The nodes in the first summing stage sum the tap-1 offset magnitude with a Baseline Wander (BLW) correction signal. The output signal of the first summing stage (i.e., tap-1+BLW correction signal) is then summed with the output signal from the CTLE in the second summing stage. The output of the second summing stage (i.e., tap-1+BLW correction signal+data) is then provided to data samplers to be sampled and quantized.

The BLW correction signal is provided by a BLW correction circuit, which includes a dedicated BLW path. The BLW correction signal generated is broadcasted in a substantially identical manner to the first summing stages in all of the transport paths in the DFE. This eliminate the need for independent baseline correction in every transport path, thus, further saving power and silicon area. Additional details of various embodiments of the low power, highly linear, 1-tap DFE are described below with reference to the figures.

Figure 2:
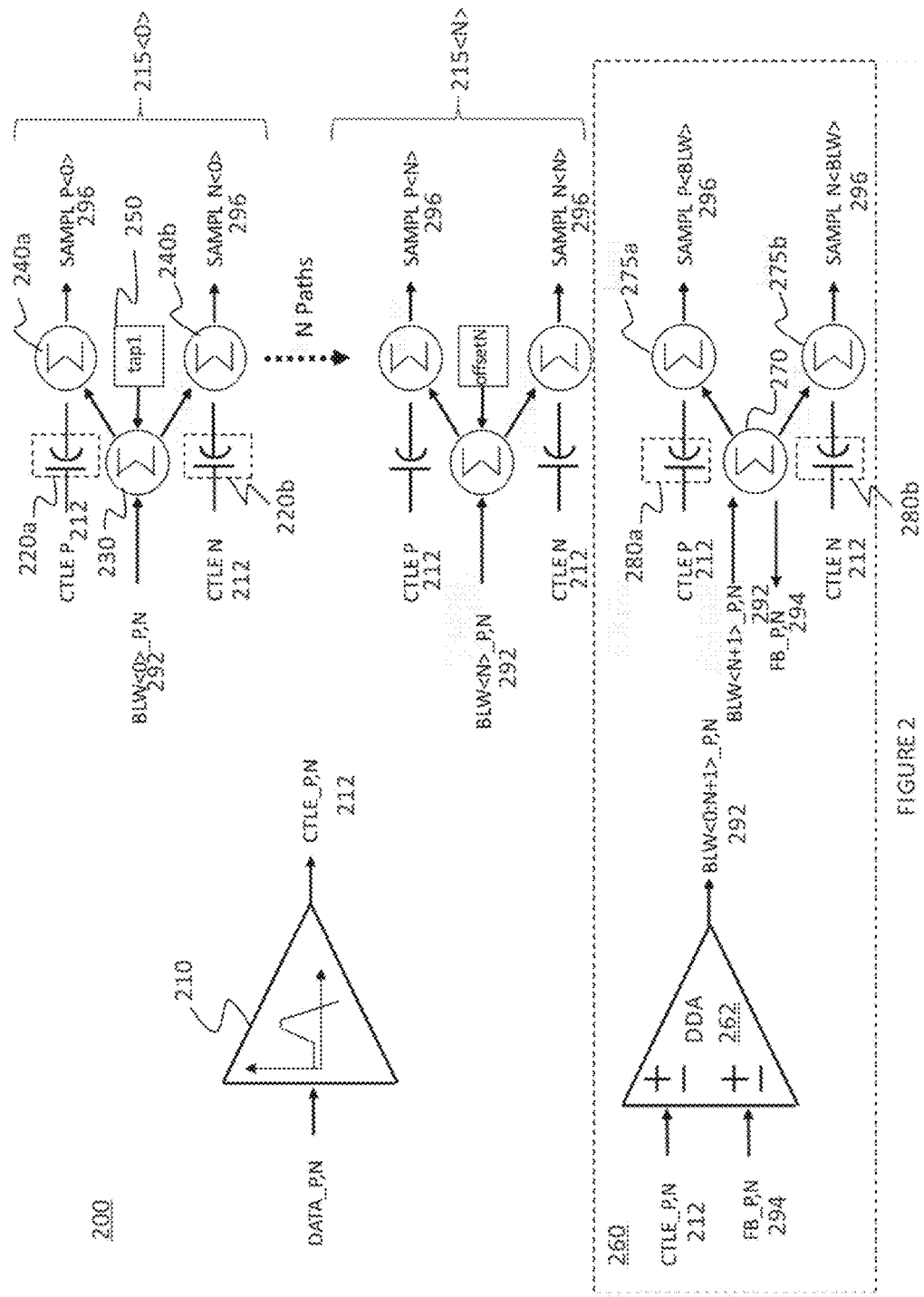
FIG. 2 shows one embodiment of a low power 1-tap decision feedback equalizer (DFE).

FIG. 2 illustrates one embodiment of a low power 1-tap DFE. The DFE 200 can be used in a receiver that receives data from an external channel to compensate for the non-ideal transfer function of the channel. For instance, some embodiments of the low power 1-tap DFE can be incorporated into a SerDes receiver. The DFE 200 includes a CTLE 210, AC-coupling networks (such as 220a and 220b), a number of transport paths 215<0>-215<N> (collectively, 215), and a baseline wander (BLW) correction circuit 260. An output 212 of the CTLE 210 is coupled to the inputs of the transport paths 215 via the AC-coupling networks. For instance, the output 212 of CTLE 210 is coupled to the transport path 215<0> via AC-coupling networks 220a and 220b. In the example illustrated, each of AC-coupling networks 220a and 220b includes a capacitor. In some embodiments, the capacitor can have a capacitance of about 330 fF. Through the AC-coupling networks, the output 212 of the CTLE 210 drives the transport paths 215, which are identical to each other.

The number of transport paths varies in different implementations. In the current example, there are N+1 transport paths, where N is an integer. In some embodiments, each of the transport paths 215 includes at least two summing stages and an offset injection element. For instance, the transport path 215<0> includes a first summing stage 230 and a second summing stage 240a and 240b. The transport path 215<0> further includes an offset injection element 250 (a.k.a. "the tap" or "a tap block") coupled to the first summing stage 230. In some implementations, the offset injection element 250 is implemented with a digital-to-analog converter (DAC), which injects an offset current into the first summing stage 230. Note that the magnitude of the offset injected may vary across the transport paths 215. In operation, data received is first provided to the CTLE 210, and its output 212 drives the transport paths 215 via the AC-coupling networks. Each of the transport paths 215 receives a corresponding pair of differential signals (P and N) of the data output from the CTLE 210. The AC-coupling networks present or impress the high frequency components of the data output from the CTLE 210 to the second summing stages of the corresponding transport paths (e.g., the second summing stage 240a and 240b of transport path <0>) at significantly lower power. The other summing stage 230 receives an offset (a.k.a. tap-1) from the offset injection element 250 and an error correction signal 292 (a.k.a. BLW) from the BLW correction circuit 260. The error correction signal 292 can include a pair of differential signals. Details of the BLW correction circuit 260 and the generation of the error correction signal 292 will be further discussed below. Referring back to transport path 215<0>, the first summing stage 230 combines the offset with the error correction signal 292, and then provides the sum (i.e., tap-1+BLW) to the second summing stage 240a and 240b. The second summing stage 240a and 240b then combines the sum from the first summing stage 230 with the data received through the AC-coupling networks 220a and 220b, respectively. The final sum (i.e., tap-1+BLW+data), labeled as SAMPL P,N<0> 296, also referred to as the equalized data, is then forwarded to a data sample latch (not shown in FIG. 2) to be sampled. Specifically, each of the outputs of the transport paths 215 have SAMPL P,N outputs, which couple to an input of a data sample latch dedicated to each connection. All data sample latches are identical in some implementations.

The implementation of AC-coupling networks and multiple summing stages in the DFE 200 provides an efficient way to passively inject the offset into the data. Such passive injection allows the DFE 200 to operate at very low power. Furthermore, it provides high linearity and low compression because, unlike active transistors, the impedance (or resistance) of a resistor is constant no matter what voltage is impressed across its terminals. However, the use of AC-coupling networks in the active stage of the receiver may introduce BLW into the data. In order to correct BLW in the data, the DFE 200 further includes the BLW correction circuit 260 dedicated to provide a BLW correction signal, which is then broadcasted to all the transport paths 215.

In some embodiments, the BLW correction circuit 260 includes a differential difference amplifier (DDA) 262, and at least two summing stages 270, 275a and 275b. A negative feedback loop is controlled by the DDA 262. The data from the CTLE 210 is provided to a first port of the DDA 262, whereas a feedback error signal 294 from the summing stage 270 is fed back to a second port of the DDA 262. The feedback error signal 294 is generated at the summing stage 270, which receives an error correction signal 292. The DDA 262 generates N+1 error correction signals substantially identical to the error correction signal 292 (also collectively labeled as BLW<0:N+1>_P,N in FIG. 2). Each of BLW<0:N> is broadcasted in substantially the same manner to the first summing stages in a respective one of the transport paths 215 (e.g., summing stage 230 in transport path 215<0>), while BLW<N+1>_P,N is input to the summing stage 270 within the BLW correction circuit 260. In other words, the same error correction signal 292 is provided to each of the first summing stages in all transport paths 215. The summing stage 270 further forwards the error correction signal 292 to the summing stage 275a and 275b. The summing stage 275a and 275b combines the error correction signal 292 with the input data 212 from CTLE 210 via AC-coupling networks 280a and 280b within the BLW correction circuit 260. Outputs from the summing stage 275a and 275b are input to a BLW sample latch (not shown). The BLW sample latch can be the same as the data sample latches coupled to the transport paths 215. By providing the dedicated BLW correction circuit 260, the need for independent baseline correction in each of the transport paths 215 is eliminated. Thus, a more efficient and compact DFE design can be achieved.

Figure 3:
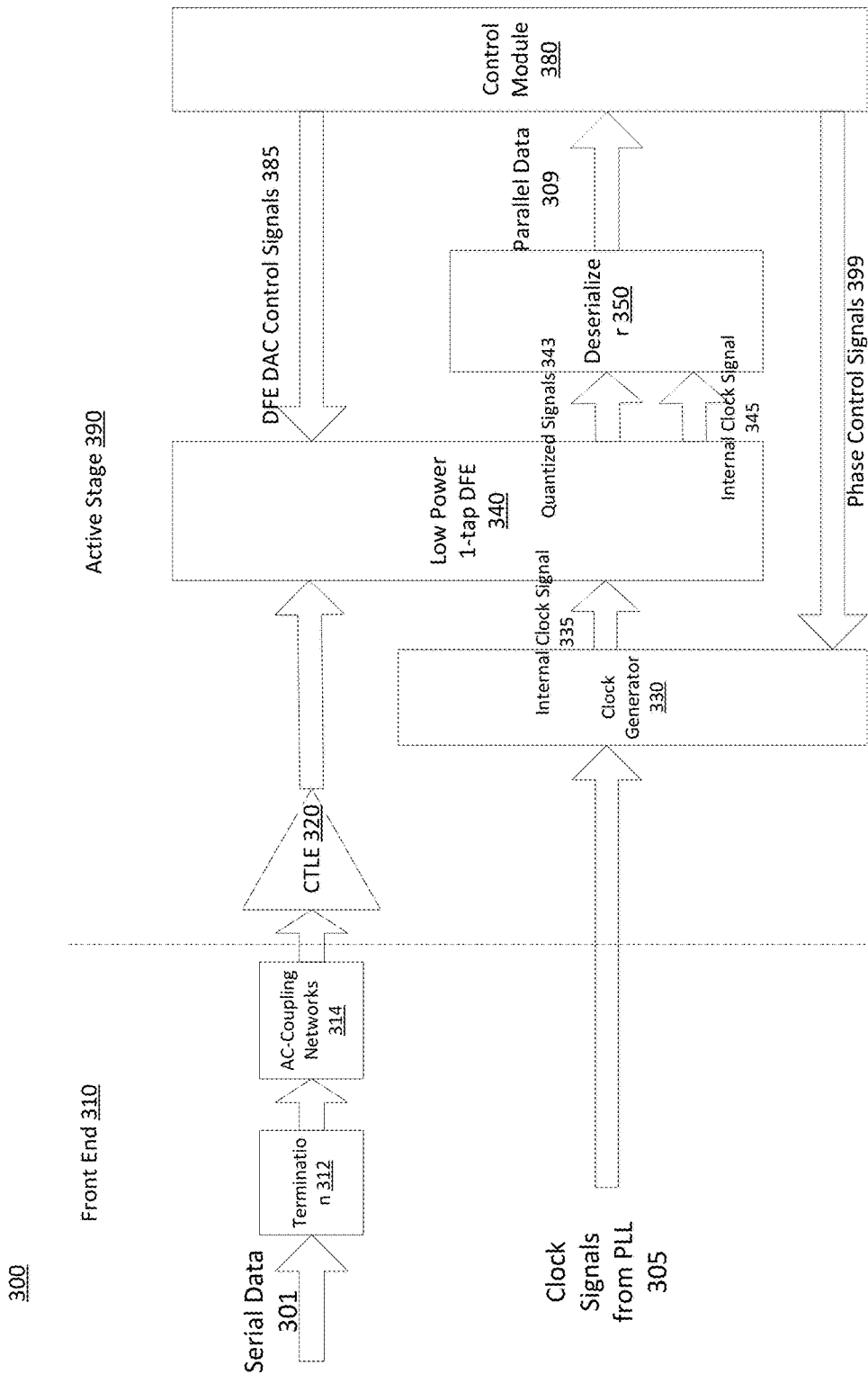
FIG. 3 shows one exemplary embodiment of a receiver in a semiconductor chip.

FIG. 3 illustrates one exemplary embodiment of a receiver in a semiconductor chip. The receiver 300 can be a SerDes receiver, which in general, receives serial data from a transmission line (not illustrated), and converts or deserializes the serial data into parallel data before forwarding the parallel data to other modules within the semiconductor chip. The receiver 300 includes a front end 310 and an active stage 390. The front end 310 can be communicably coupled to the transmission line to receive the serial data 301. The front end 310 typically includes a termination 312, AC-coupling networks 314, and a CTLE 320. The active stage 390 includes a clock generator 330, a low power 1-tap DFE 340, a deserializer 350, and a control module 380.

As mentioned above, the receiver 300 receives serial data 301 from the transmission line. The serial data 301 typically includes a stream of differential signals. In some embodiments, the serial data 301 from the transmission line is first input to the termination 312. The termination 312 is configured to present a desired amount of impedance to the transmission line. The termination 312 may be implemented with one or more transistors and/or resistors. The termination 312 is further coupled to a set of AC-coupling networks 314. The AC-coupling networks 314 are configured to remove any unknown common mode voltage in the serial data 301 received. The AC-coupling networks 314 can be implemented with one or more capacitors. The AC-coupling networks 314 are further coupled to the CTLE 320 in the active stage 390 of the receiver 300.

As illustrated in FIG. 3, the active stage 390 of the receiver 300 includes a clock generator 330, a CTLE 320, a low power 1-tap DFE 340, a deserializer 350, and a control module 380. The control module 380 can generate a set of phase control signals 399 to control the clock generator 330. The clock generator 330 receives clock signals 305 from a phase lock loop (PLL) (not shown), and generates an internal clock signal 335. The CTLE 320 is configured to equalize the differential signals of the serial data 301 to counter combined adverse effects of the transmission line and the transmitter (from which the serial data 301 has been sent). The CTLE 320 can be further configured to remove intersymbol interference (ISI) from the differential signals. The DFE 340 receives the internal clock signal 335 from the clock generator 330. In addition, the DFE 340 receives the differential signals from the CTLE 320. The DFE 340 may further receive a set of DFE digital-to-analog converter (DAC) control signals 385 from the control module 380. The DAC control signals control the magnitude of the offset which will be injected into the first summing stages of the 1-tap DFE 340 as discussed above with reference to FIG. 2.

During operation, the 1-tap DFE 340 passively injects an offset into the differential signals from the CTLE 320. Because the offset is passively injected, the 1-tap DFE 340 is able to run on substantially lower power compared to conventional resistively loaded or capacitively loaded DFEs. In addition to passive offset injection, the 1-tap DFE 340 also generates a baseline wander (BLW) correction signal based on the differential signals from the CTLE 320 and injects the BLW correction signal into the differential signals from the CTLE 320 with the offset. The 1-tap DFE 340 then quantizes the differential signals with the offset and BLW correction and outputs the quantized signals 343 to the deserializer 350. In addition, the 1-tap DFE 340 outputs an internal clock signal 345 to the deserializer 350. In some embodiments, the deserializer 350 may include a clock divider to divide the clock signal 345 received. The deserializer 350 is further configured to deserialize the quantized signals 343 from the 1-tap DFE 340 to generate parallel data 309. The parallel data 309 may be forwarded to the control module 380 and/or other modules within the semiconductor chip. Details of some embodiments of the 1-tap DFE 340 are described above with reference to FIG. 2.

Figure 4:
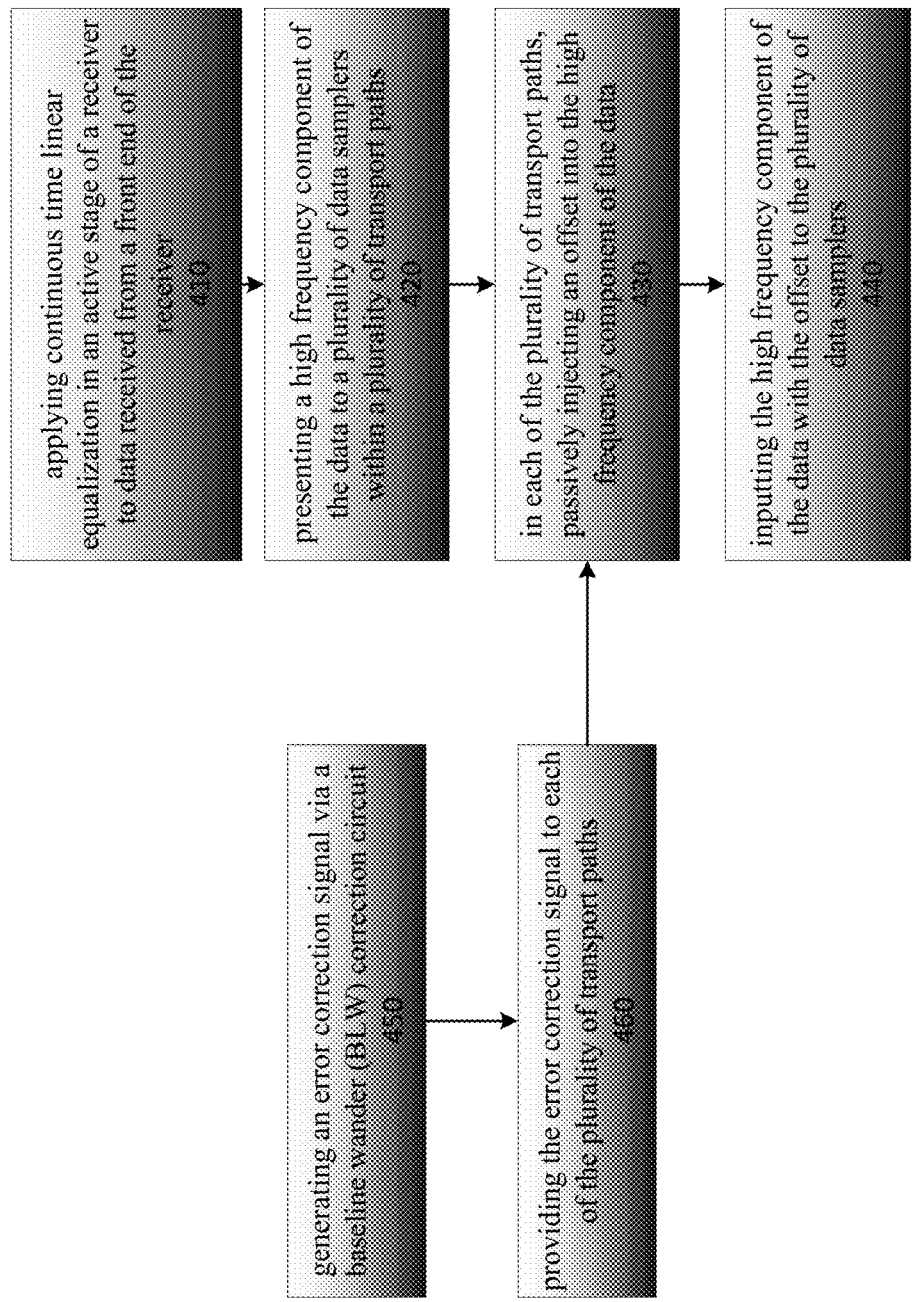
FIG. 4 illustrates a flow diagram of one exemplary embodiment of a process to provide decision feedback equalization in a receiver.

FIG. 4 illustrates a flow diagram of one exemplary embodiment of a process to provide decision feedback equalization in a receiver. In some embodiments, the receiver is a SerDes receiver for receiving signals from a high speed serial link. The process can be performed by some embodiments of a low power 1-tap DFE, such as the DFE 200 illustrated in FIG. 2, within some embodiments of a receiver, such as the receiver 300 illustrated in FIG. 3.

In some embodiments, the process 400 starts with applying continuous time linear equalization in an active stage of a receiver to data received from a front end of the receiver (block 410). Then a high frequency component of the data is presented to a plurality of data samplers within a plurality of transport paths (block 420). For example, the AC-coupling networks (e.g., 220a and 220b) shown in FIG. 2 can present the high frequency component of the data to data samplers in the transport paths. In each of the plurality of transport paths, an offset can be passively injected into the high frequency component of the data (block 430). Then the high frequency component of the data with the offset is input to the plurality of data samplers (block 440).

By passively injecting the offset into the high frequency component of the data, the process to provide decision feedback equalization does not consume as much power as other conventional equalization processes. However, such passive offset injection may lead to BLW in the resultant signals. Thus, some embodiments of the process to provide decision feedback equalization further includes BLW correction as discussed in details below.

In some embodiments, an error correction signal is generated via a baseline wander (BLW) correction circuit (block 450), such as the BLW correction circuit 260 as shown in FIG. 2. In some embodiments, the BLW correction circuit includes a DDA, and the error correction signal is generated by presenting the data to a first port of the DDA, and feeding back an error signal from a first summing stage of the BLW correction circuit to a second port of the DDA. The DDA then generates the error correction signal. The error correction signal is provided to each of the plurality of transport paths in substantially the same manner (block 460). The error correction signal may be combined with the data and the offset in each of the transport paths. Since each of the transport paths receives the same error correction signal, there is no need to provide an independent BLW correction scheme in each of the transport paths, thus reducing the size and complexity of the DFE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A decision feedback equalizer (DFE), comprising:
a plurality of AC-coupling networks, each having an input coupled to an output of a continuous time linear equalizer (CTLE) within an active stage of a receiver to receive a corresponding pair of differential signals of data from the CTLE, and an output coupled to a respective one of a plurality of data samplers to present a high frequency component of the corresponding pair of differential signals to the respective one of the plurality of data samplers; and
a plurality of transport paths, each of the plurality of transport paths coupled to a respective one of the plurality of AC-coupling networks to receive the corresponding pair of differential signals from the respective one of the plurality of AC-coupling networks, each of the plurality of transport paths comprising
one of the plurality of data samplers, and
an injection element to passively inject an offset into the high frequency component of the corresponding pair of differential signals at an input of the respective one of the plurality of data samplers.

2. The DFE of claim 1, wherein each of the plurality of AC-coupling networks comprises a pair of capacitors.

3. The DFE of claim 1, further comprising:
a baseline wander (BLW) correction circuit to provide an error correction signal to each of the plurality of transport paths.

4. The DFE of claim 3, wherein the BLW correction circuit comprises:
a first summing stage; and
a differential difference amplifier (DDA) having a first input and a second input, the first input being configured to receive the data from the CTLE and the second input being configured to receive a feedback error signal from the first summing stage of the BLW correction circuit.

5. The DFE of claim 4, wherein the DDA is configured to generate the error correction signal based on the input data and the feedback error signal from the first summing stage.

6. A method to provide decision feedback equalization, comprising:
applying continuous time linear equalization in an active stage of a receiver to data received from a front end of the receiver;
presenting a high frequency component of the data to a plurality of data samplers within a plurality of transport paths;
in each of the plurality of transport paths, passively injecting an offset into the high frequency component of the data; and
inputting the high frequency component of the data with the offset to the plurality of data samplers.

7. The method of claim 6, further comprising:
generating an error correction signal via a baseline wander (BLW) correction circuit; and
providing the error correction signal to each of the plurality of transport paths.

8. The method of claim 7, wherein the BLW correction circuit includes a differential difference amplifier (DDA), and generating the error correction signal includes using the DDA to generate the error correction signal based on the data and a feedback error signal.

9. An apparatus, comprising:
means for passively injecting an offset to data received in an active stage of a receiver;
means for providing baseline wander (BLW) correction to the data received;
a continuous time linear equalizer (CTLE) to receive the data from a front end of the receiver; and
means for presenting a high frequency component of data output from the CTLE to the means for passively injecting the offset;
wherein the means for providing the baseline wander correction includes
a negative feedback loop, and
a differential difference amplifier (DDA) configured to receive the data output from the CTLE and an error signal through the negative feedback loop, and to generate a BLW correction signal to be provided to the means for passively injecting the offset to the data received; and
wherein the means for passively injecting the offset to the data received includes a plurality of transport paths, each transport path having:
an injection element to provide the offset;
a first summing stage to combine the BLW correction signal and the offset from the injection element; and
a second summing stage to combine an output from the first summing stage and the data output from the CTLE.

10. A semiconductor chip, comprising:
a receiver comprising a front end and an active stage, the front end including
a plurality of input pads to receive data from an external source, and a first plurality of AC-coupling networks coupled between the input pads and the active stage to pass the data from the plurality of input pads to the active stage, the active stage including
a continuous time linear equalizer (CTLE) to receive the data from the first plurality of AC-coupling networks in the front end, and
a decision feedback equalizer (DFE) having
a second plurality of AC-coupling networks, each having an input coupled to an output of the CTLE to receive a corresponding pair of differential signals from the CTLE; and
a plurality of transport paths, each of the plurality of transport paths coupled to a respective one of the second plurality of AC-coupling networks to receive the corresponding pair of differential signals from the respective one of the second plurality of AC-coupling networks, each of the plurality of transport paths comprising
an injection element to passively inject an offset into the corresponding pair of differential signals.

11. The semiconductor chip of claim 10, wherein each of the second plurality of AC-coupling networks comprises a pair of capacitors.

12. The semiconductor chip of claim 10, wherein the DFE further comprises:
a baseline wander (BLW) correction circuit to provide an error correction signal to each of the plurality of transport paths.

13. The semiconductor chip of claim 12, wherein the BLW correction circuit comprises:
a first summing stage; and
a differential difference amplifier (DDA) having a first input and a second input, the first input being configured to receive data from the output of the CTLE and the second input being configured to receive a feedback error signal from the first summing stage of the BLW correction circuit.

14. The semiconductor chip of claim 13, wherein the DDA is configured to generate the error correction signal based on the data and the feedback error signal from the first summing stage.

15. The semiconductor chip of claim 10, wherein the receiver is a serializer/deserializer (SerDes) receiver.

* * * * *